(12) United States Patent
Jain et al.

(10) Patent No.: US 12,106,234 B2
(45) Date of Patent: Oct. 1, 2024

(54) PAYMENT CONSOLIDATION FOR A TRAVEL MANAGEMENT SYSTEM

(71) Applicant: AMADEUS S.A.S., Biot (FR)

(72) Inventors: Rohan Jain, London (GB); Yann Matthieu Elie Auguste Armelin, Marseilles (FR); Fabien Rizk, Roquefort-les-Pins (FR); Hela Othmani, Vallauris (FR)

(73) Assignee: Amadeus S.A.S., Biot (FR)

( * ) Notice: Subject to any disclaimer, the term of this patent is extended or adjusted under 35 U.S.C. 154(b) by 220 days.

(21) Appl. No.: 17/498,184

(22) Filed: Oct. 11, 2021

(65) Prior Publication Data

US 2023/0115713 A1    Apr. 13, 2023

(51) Int. Cl.
*G06Q 10/02* (2012.01)
*G06Q 20/40* (2012.01)

(52) U.S. Cl.
CPC ......... *G06Q 10/02* (2013.01); *G06Q 20/4014* (2013.01); *G06Q 20/4016* (2013.01)

(58) Field of Classification Search
CPC . G06Q 10/02; G06Q 20/4014; G06Q 20/4016
(Continued)

(56) References Cited

U.S. PATENT DOCUMENTS

| 10,528,895 | B2 | 1/2020 | Sedlarevic et al. |
| 11,093,912 | B1 | 8/2021 | Fakhraie et al. |

(Continued)

FOREIGN PATENT DOCUMENTS

| EP | 2746999 A1 | 6/2014 | |
| WO | 2005/079425 A2 | 9/2005 | |
| WO | WO-2020041145 A1 * | 2/2020 | ............. G06F 16/29 |

OTHER PUBLICATIONS

Song et al., The Design and Implementation of Mobile Intelligent Terminal Guide System based on the Internet of Things, 2014 Seventh International Symposium on Computational Intelligence and Design (Year: 2014).*

(Continued)

*Primary Examiner* — Paul S Schwarzenberg
(74) *Attorney, Agent, or Firm* — Thompson Hine LLP

(57) ABSTRACT

Methods, systems, and computer program products for implementing a payment consolidation process for travel management systems. A payment request including a travel record identification is received at a payment consolidation server via a payment consolidation user interface. A payment identification is associated with the travel record identification, and the payment consolidation user interface provides access to a plurality of payment processor servers through a single interface. The payment consolidation server obtains eligible payment processor information associated with the travel record identification from a reservation system. The payment consolidation server accesses a first (Continued)

software development kit (SDK) from a first payment provider and a second SDK from a second payment provider based on the eligible payment processor information. The payment consolidation server then updates the payment consolidation user interface with a first interface element associated with the first SDK and a second interface element associated with the second SDK.

14 Claims, 6 Drawing Sheets

(58) Field of Classification Search
USPC .......................................................... 705/44
See application file for complete search history.

(56) References Cited

U.S. PATENT DOCUMENTS

| 11,106,515 | B1 | 8/2021 | Fakhraie et al. | |
|---|---|---|---|---|
| 2010/0145861 | A1* | 6/2010 | Law | G06Q 20/3821 |
| | | | | 705/40 |
| 2014/0081861 | A1* | 3/2014 | Berland | G06Q 10/087 |
| | | | | 705/44 |
| 2014/0172472 | A1 | 6/2014 | Florimond et al. | |
| 2015/0228018 | A1 | 8/2015 | Richman | |
| 2015/0242834 | A1 | 8/2015 | Goldsmith et al. | |
| 2015/0242835 | A1 | 8/2015 | Vaughan et al. | |
| 2016/0048864 | A1 | 2/2016 | Beer et al. | |
| 2016/0371692 | A1 | 12/2016 | Clyne | |
| 2017/0278108 | A1 | 9/2017 | Hays et al. | |
| 2018/0046944 | A1 | 2/2018 | Barbera et al. | |
| 2018/0089598 | A1 | 3/2018 | Sedlarevic et al. | |
| 2019/0303923 | A1 | 10/2019 | Arora et al. | |

OTHER PUBLICATIONS

European Patent Office, Extended Search Report and Opinion issued in European Patent Application No. 22306474.2 on Mar. 3, 2023, 9 pages.
U.S. Patent and Trademark Office, Final Office Action issued on Nov. 30, 2022 in U.S. Appl. No. 17/326,745, 16 pages.
Mathieu Le Marier et al., "Integrated Payment Travel Management System" filed on May 21, 2021 as a U.S. Appl. No. 17/326,745.
European Patent Office, International Search Report and Written Opinion issued in International Application No. PCT/EP2022/063192 on Sep. 12, 2022, 14 pages.
U.S. Patent and Trademark Office, Non-Final Office Action issued on Apr. 21, 2022 in U.S. Appl. No. 17/326,745.
N. Ray, A. Banerjee, S. Ghosh and D. K. Das, "A Study on Application of Information Technology on Tourism Development," 2011 International Conference on Management and Service Science, 2011, pp. 1-7, doi: 10.1109/ICMSS.2011.5998707. (Year: 2011).
U.S. Patent and Trademark Office, Final Office Action issued in U.S. Appl. No. 17/326,745 on Nov. 13, 2023, 15 pages.
U.S. Patent and Trademark Office, Non-Final Office Action issued in U.S. Appl. No. 17/326,745 on Nov. 27, 2023, 18 pages.
U.S. Patent and Trademark Office, Final Office Action issued in U.S. Appl. No. 17/326,745 on May 24, 2024, 25 pages.

* cited by examiner

PAYMENT CONSOLIDATION FOR A TRAVEL MANAGEMENT SYSTEM

TECHNICAL FIELD

The present invention generally relates to computers and computer software, and more specifically, to methods, systems, and computer program products for implementing a payment consolidation process.

BACKGROUND

In order for a travel provider to be able to handle moving towards a more standard retail industry approach for integrating multiple payment transactions from different software systems (e.g., software development kits (SDKs)) and fraud prevention (e.g., modern touchpoints, frictionless flows, removing intermediaries, and the like), a travel provider needs to ensure that their frontend systems and customer graphical user interface (GUI) touchpoints maintain synergies between the New Distribution Capability (NDC) context (e.g., passenger name record (PNR) systems) and the payment context. For example, the International Air Transport Association (IATA) introduced the NDC standard to enable "airline retailing" to be more streamlined.

Merchants need to integrate the various SDKs individually on their touchpoints in order to accept payments. For example, the airline industry may desire to offer payment scope (e.g., credit cards, digital payment vehicles, cryptocurrency, fraud check, and the like) on all the airline merchants digital touchpoints (e.g., booking, check-in, etc.). Offering a variety of payment options, authentication, fraud check, etc., will require an entity to integrate each of the different SDKs on their website. This consolidation to the website leads to an increase in cost for the entity, longer time to market, and increase in complexity. Additionally, a payment operation related to payment and PNR needs to be performed on the backend servers (e.g., reward payments such as using miles with cash payments, fee calculations, etc.). Moreover, the airline industry will also need to maintain their PNR integration and payment orchestration logic on the backend side to match with the payment SDKs integrated on their frontends.

In some conventional reservation systems, payment information is provided in a manner such that the payment information cannot be authenticated. For example, a travel customer may communicate with a travel agent using telephone communication, and the travel customer may provide the travel agent payment information verbally. In this example, the travel agent enters the payment information at a reservation device, such as a computer, and the payment information is not verified/authenticated. As another example, if a travel customer books travel with a travel agent in person, unless the travel agency is equipped with electronic payment capture devices (i.e., credit card readers, etc.), the payment information (e.g., a credit card number) may still be fraudulent. As such, for these conventional payment channels for travel reservations, the payments submitted through such channels may be considered unsecure.

In general, unsecured payments increase costs for travel merchants (e.g., airlines, rail travel providers, hotels, etc.), travel booking systems (e.g., global distribution systems), and/or third party reservation services (e.g., travel agencies), as liability for fraudulent payments through unsecured payment channels typically remains with the travel merchant, travel booking system, and/or third party reservation service.

In addition, because the travel merchant, booking system, and/or third-party reservation service handle the payment information for such unsecured payment channels, the travel merchant, booking system, and/or third-party reservation service may be required to comply with various security standards for sensitive payment information. For example, the travel merchant, booking system, and/or third-party reservation service may be required to comply with the Payment Card Industry Data Security Standard (PCI DSS), which is an information security standard for organizations that handle cardholder information for many debit, credit, prepaid, e-purse, ATM, and point of sale (POS) payment cards. Complying with such standards typically increases costs associated with processing payments for travel reservations.

Moreover, many travel merchants and reservation systems utilize a travel agency selling model, i.e., travel agencies distribute a travel merchant's products on behalf of the travel merchant. However, the travel merchant generally is liable for the payment, even in the case of fraudulent payments. Therefore, in conventional systems utilizing the travel agency selling model, travel merchants are generally dependent on travel agency procedures to secure payments.

Whenever travel merchants and reservation systems accept payment, they need to be sure that the data is consistent and that they are able to provide all necessary information (e.g., the code, etc.) that they might require for the eventual accounting reconciliation purpose. For example, the travel merchants need to ensure that data is available for their back office and have the capability to maintain an integration of payment data inside their booking system. Thus, improved methods, systems, and computer program products for providing improved payment consolidation systems for travel bookings are needed.

SUMMARY

In embodiments of the invention, a method for implementing a payment consolidation process is provided. The method includes receiving, at a payment consolidation server via a payment consolidation user interface at a client device, a payment request including a travel record identification from a travel provider server. A payment identification is associated with the travel record identification. The payment consolidation user interface is a first level interface that provides access to a plurality of payment processor servers. Eligible payment processor information associated with the travel record identification is obtained from a reservation system at the payment consolidation server. The reservation system processed the travel record identification. A first software development kit (SDK) is accessed from a first payment provider and a second SDK from a second payment provider based on the eligible payment processor information. The first SDK includes a different configuration than the second SDK. The payment consolidation user interface with a first interface element associated with the first SDK and a second interface element associated with the second SDK is updated.

These and other embodiments can each optionally include one or more of the following features.

In some embodiments of the invention, the method further includes receiving payment data from the client device via the first SDK at the payment consolidation user interface.

In some embodiments of the invention, the method further includes, in response to receipt of the payment data from the client device, obtaining, at the payment consolidation server, payment transaction data associated with the travel record identification from a payment processor via a payment gateway using the payment identification, updating, by the payment consolidation server, the travel record by consolidating the payment transaction data into the travel record, and providing, by the payment consolidation server, the updated travel record to the reservation system.

In some embodiments of the invention, the payment consolidation user interface includes a third interface element associated with a third SDK that is associated with a fraud service entity, and the method further includes receiving fraud information associated with the payment transaction data via the third SDK.

In some embodiments of the invention, the method further includes accessing, via a fraud database, fraud verification information associated with the travel record identification based on the first payment provider, and verifying the payment transaction data is not fraudulent.

In some embodiments of the invention, the method further includes determining that a first merchant associated with the payment transaction data matches a second merchant associated with the travel record data, determining that authorization of payment associated with the payment transaction data is successful, determining that an authorization associated with the payment transaction data is valid based on an authorization time stamp, determining that there is not an attempted follow-up operation or a pending follow-up operation associated with the payment transaction data, determining that an amount and currency of payment associated with the payment transaction data is available, and/or determining that a payment instrument associated with the payment transaction data matches a payment instrument associated with the travel record data.

In some embodiments of the invention, receiving the payment data from the device via the first SDK at the payment consolidation user interface further includes performing authentication of the client device based on the travel record identification.

In some embodiments of the invention, the method further includes determining that the payment identification has not been already received by comparing the payment identification to other received payment identifications.

In embodiments of the invention, a computing apparatus for implementing a payment consolidation process is provided. The computing apparatus includes one or more processors, at least one memory device coupled with the one or more processors, and a data communications interface operably associated with the one or more processors. The at least one memory device contains a plurality of program instructions that, when executed by the one or more processors, cause the including apparatus to perform operations. The operations include receive, at a payment consolidation server via a payment consolidation user interface at a client device, a payment request including a travel record identification from a travel provider server. A payment identification is associated with the travel record identification. The payment consolidation user interface is a first level interface that provides access to a plurality of payment processor servers. Eligible payment processor information associated with the travel record identification is obtained from a reservation system at the payment consolidation server. The reservation system processed the travel record identification. A first software development kit (SDK) is accessed from a first payment provider and a second SDK from a second payment provider based on the eligible payment processor information. The first SDK includes a different configuration than the second SDK. The payment consolidation user interface with a first interface element associated with the first SDK and a second interface element associated with the second SDK is updated.

In embodiments of the invention, a non-transitory computer storage medium encoded with a computer program is provided, the computer program including a plurality of program instructions that when executed by one or more processors cause the one or more processors to perform operations. The operations include receive, at a payment consolidation server via a payment consolidation user interface at a client device, a payment request including a travel record identification from a travel provider server. A payment identification is associated with the travel record identification. The payment consolidation user interface is a first level interface that provides access to a plurality of payment processor servers. Eligible payment processor information associated with the travel record identification is obtained from a reservation system at the payment consolidation server. The reservation system processed the travel record identification. A first software development kit (SDK) is accessed from a first payment provider and a second SDK from a second payment provider based on the eligible payment processor information. The first SDK includes a different configuration than the second SDK. The payment consolidation user interface with a first interface element associated with the first SDK and a second interface element associated with the second SDK is updated.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
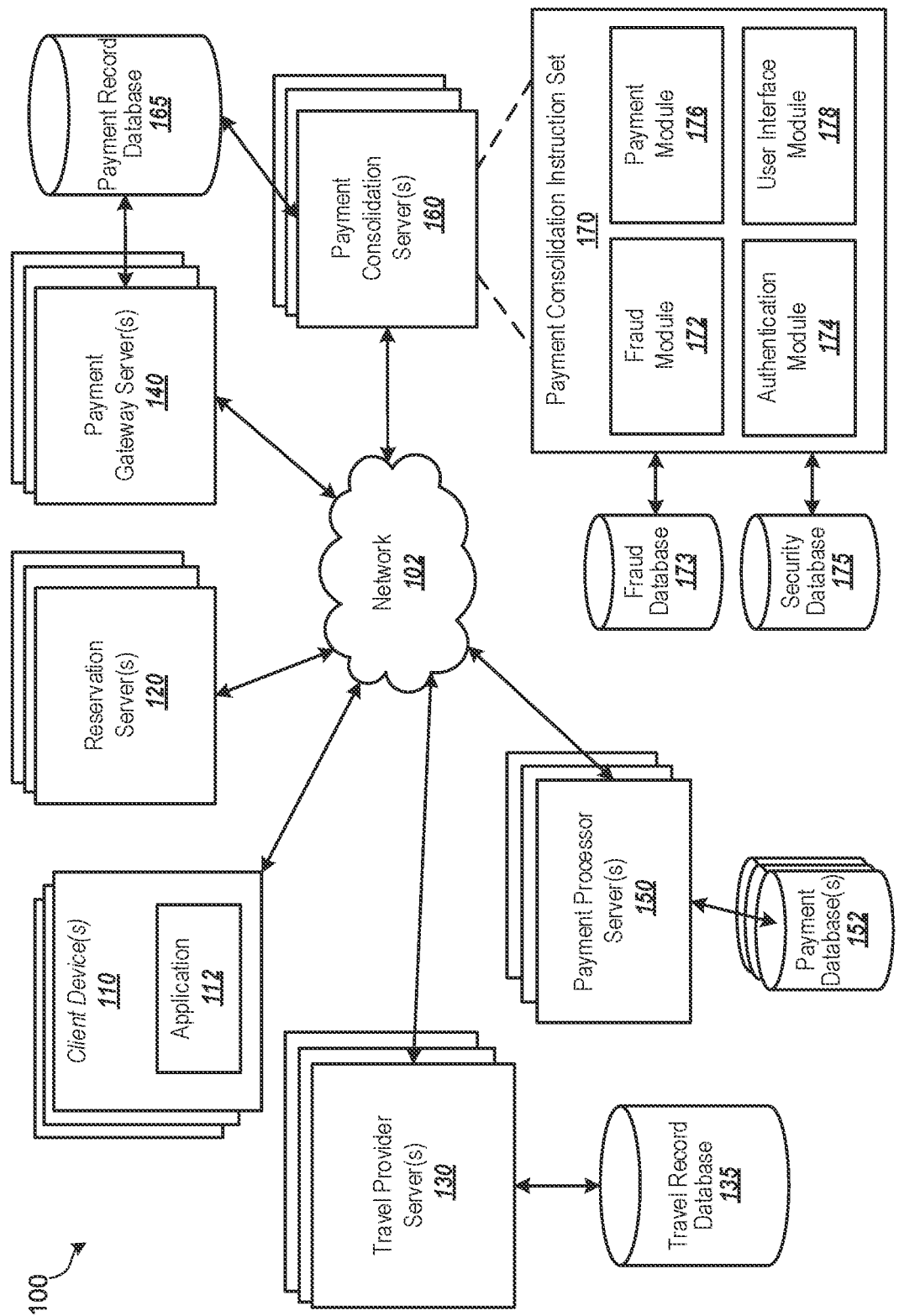
FIG. 1 illustrates a distributed database environment for implementing a payment consolidation process, according to embodiments of the invention.

In order for a travel provider to be able to handle moving towards a more standard retail industry approach for integrating multiple payment transactions from different software systems (e.g., software development kits (SDKs)) and fraud prevention (e.g., modern touchpoints, frictionless flows, removing intermediaries, and the like), a travel provider needs to ensure that their frontend systems and customer graphical user interface (GUI) touchpoints maintain synergies between the New Distribution Capability (NDC) context (e.g., passenger name record (PNR) systems) and the payment context. A software development kit is a collection of software development tools in one installable package. They facilitate the creation of applications by having a compiler, a debugger, and perhaps a software framework. They are normally specific to a hardware platform and operating system combination. This disclosure provides different capabilities to payment and fraud providers that have moved from traditional backend APIs and webservices to modern GUI based payment systems offering GUI components to accept payments by using a payment consolidation user interface providing access to multiple payment transactions from different software systems (e.g., via SDKs).

Merchants need to integrate the various SDKs individually on their touchpoints in order to accept payments. For example, the airline industry may desire to offer payment scope (e.g., credit cards, digital payment vehicles, cryptocurrency, fraud check, and the like) on all the airline merchants digital touchpoints (e.g., booking, check-in, etc.). Airlines will need to integrate each of the different SDKs on their website. This leads to an increase in cost for an airline, longer time to market, and increase in complexity. Additionally, a payment operation related to payment and the PNR needs to be performed on the backend servers (e.g., reward payments such as using miles with cash payments, fee calculations, etc.). Moreover, the airline industry will also need to maintain their PNR integration and payment orchestration logic on the backend side to match with the payment SDKs integrated on their frontends.

The technology in this patent application is related to systems and methods for implementing a payment consolidation process utilizing one or more payment consolidation servers that are in communication with the travel providers, travel reservation systems, and payment processors via a payment platform gateway. The payment consolidation process integrates a checkout process as a single interface to perform payment and updates a payment record (e.g., a passenger name record (PNR)) with payment details. The payment consolidation instruction set dynamically loads third party systems (e.g., SDKs) when needed, hides complexity from a merchant point of view, and provides effortless travel integration for each payment record (e.g., PNRs) for each merchant.

In one example, embodiments of the invention may include a consolidation process that can help to perform high data consumption calculations centrally. For example, a particular airline entity can have hundreds of rules defined in the payment system to calculate a credit card surcharge based on the content of the PNR. This is something that cannot be done in the absence of any interaction or a solution to actually connect with the reservation system calculator. Thus, the system can calculate fees, apply them, and then return the information back to the user interface so that it can then be used to perform authentication.

Embodiments of the invention may only include relevant information that may be displayed and/or sent to the payment processors to limit the amount of information that is shared. For example, the decision on whether the information is relevant may be determined by a payment consolidation instruction set based on all information available related to the travel booking (e.g., airline information, passenger information, etc.). Additionally, the relevant information may then be shared through an interface via an open interface message protocol (e.g., JavaScript Object Notation (JSON) message, or the like). Although some digital payment systems require individual interfacing, the integration with a unified payment consolidation user interface with defined JSON messages may be used to normalize the interaction between the payment consolidation user interface, the backend payment processes, and the PNR itself. Thus, for example, when the merchant loads a third-party SDK from a payment entity based on the PNR context, payment consolidation servers would know, for example, whether or not to actually display a payment entity's icon (e.g., a payment link, such as a selectable button/icon).

Embodiments of the invention may include a payment consolidation instruction set that allows a traveler to pay for a portion of a booking using frequent flier miles or another form of credit that is applied to the traveler's record before processing with a payment processor entity. For example, payment consolidation servers would determine at checkout whether to retrieve this information from the travel provider (e.g., the airline), and/or whether to present that option of using miles to pay for a portion of the travel booking and send that information to the single user interface.

Although the examples provided herein reference the travel industry, the consolidation processes described may be applied to any order management system.

FIG. 1 is an example environment 100 of a distributed database environment for implementing a payment consolidation process, according to embodiments of the invention. The example environment 100 includes one or more client device(s) 110, one or more travel reservation server(s) 120, one or more travel provider server(s) 130, one or more payment gateway server(s) 140, one or more payment processor server(s) 150, and one or more payment consolidation server(s) 160, that communicate over a data communication network 102, e.g., a local area network (LAN), a wide area network (WAN), the Internet, a mobile network, or a combination thereof.

The one or more client device(s) 110 (e.g., a device used by a requestor) can include a desktop, a laptop, a server, or a mobile device, such as a smartphone, tablet computer, wearable device (e.g., smartwatch), in-car computing device, and/or other types of mobile devices. Additionally, the one or more client device(s) 110 may be public uses devices such as a kiosk, a user terminal, and the like. The one or more client device(s) 110 includes applications, such as the application 112, for managing a travel booking request to/from the one or more travel reservation server(s) 120. The one or more client device(s) 110 can include other applications. The one or more client device(s) 110 initiates a travel booking request by a requestor via application 112. The travel booking request may include availability search queries by requesting entities (such as clients, applications, browsers installed on user terminals, etc.) in the course of a search (e.g., airline booking search). The one or more client device(s) 110 may be utilized by a customer to review a reserved travel booking and provide and authenticate payment information for the reserved travel booking. Additionally, a requestor of a travel booking using the one or more client device(s) 110 may include an airline agency, travel agency, other dedicated global distribution systems (GDS), as for example airlines reservation systems which provide flight search applications for shopping business like flight booking, and the like.

The one or more travel reservation server(s) 120 manages travel booking requests received from application 112 from the one or more client devices 110. The one or more travel reservation server(s) 120 may be a personal computing device, tablet computer, thin client terminal, smart phone and/or other such computing device. The one or more travel reservation server(s) 120 receive booking data from a client device to reserve a travel reservation and generate a PNR for that particular travel product(s) associated with the booking data. Although a PNR is described as being generated, which is in regard to an example of an airline booking, the systems described herein could further include any other type of order management system for other travel providers, such as hotels, rental cars, etc., capable of generating a record associated with booking data. As such, in general, a reservation application executes on a reservation device (e.g., application 112 on client device 110) to generate a front end through which a travel agent may interface with the reservation server 120 to reserve a travel booking for a travel customer. For example, a reservation device executing a reservation application may operate as a remote terminal connected to reservation server 120, and a travel agent may reserve a travel booking for a travel customer by interfacing with the reservation server 120 using the client device 110. For example, the client device 110 executing the reservation application may provide a command-line interface to a GDS embodied by the reservation server 120. In this example, the booking data communicated by the client device 110 may be in a travel agency format, such as command-line. Additionally, after a consumer on a client device 110 confirms an issuance for the particular travel product(s) associated with the booking data, a reservation server 120 initiates a payment process by sending an order request to the one or more travel provider server(s) 130 associated with the requested travel product(s) from the consumer.

The one or more travel provider server(s) 130 (e.g., travel merchants) generally include airlines, rail travel providers, hotels, and/or other such merchants that offer travel or travel-related services to customers using client devices 110. The one or more travel provider server(s) 130 generally facilitate remote communication therewith to reserve travel or travel-related service from a particular travel merchant. After a consumer on a client device 110 confirms an issuance for the particular travel product(s) associated with the booking data, a travel provider server 130 receives an order request from a reservation server 120 and initiates a payment process by requesting payment from the client device 110. After receiving a payment confirmation for a particular travel booking, a travel provider server 130 may request and receive a travel record ID from the reservation server 120 and send booking confirmation to the client device 110 via the reservation server 120. Additionally, the one or more travel provider server(s) 130 are configured to initiate a payment consolidation process after receiving a payment confirmation from the one or more payment processor server(s) 150 via the one or more payment gateway server(s) 140 and send booking confirmation data by sending a payment request to the one or more payment consolidation server(s) 160.

The one or more travel provider server(s) 130 may be front end server(s) for managing, collecting, processing, and communicating travel records (e.g., travel booking requests, resource information, revenues management data, bookings data, airlines/system configurations data, etc.), that is stored in the travel record database 135. Further, the one or more travel provider server(s) 130 may be front end server(s) for managing, collecting, processing, and communicating payment requests and payment consolidation data from one or more payment consolidation server(s) 160 to the one or more reservation server(s) 120.

The one or more payment gateway server(s) 140 manages the payment transactions of travel booking requests received from application 112 between the one or more client devices 110 and the payment processor server(s) 150. The management protocols of the one or more payment gateway server(s) 140 may be based on a redundant load-balancing system by managing multiple clients (e.g., client device(s) 110) so that a payment associated with a travel booking request is handled by one of the one or more payment processor server(s) 150. For example, there may be multiple payment processor server(s) 150 that are able to service the travel booking payment, and the redundant load-balancing system of the payment gateway server(s) 140 is responsible for ensuring that the travel booking request is performed by one of the capable payment processor server(s) 150. Payment processors include for example, a credit/debit card issuer, a bank, digital payment service, etc., and the one or more servers for each payment processor generally facilitate remote communication therewith to authenticate and/or authorize a payment via a payment gateway server 140. The payment transaction data may be stored in one or more payment database(s) 152 associated with each payment processor.

The one or more payment consolidation server(s) 160 receives and processes the payment request(s) from a reservation server 120. The one or more payment consolidation server(s) 160 includes a payment consolidation instruction set 170 that performs a payment consolidation protocol according to processes described herein. The payment consolidation instruction set 170 may include a fraud module 172 for performing fraud checks of travel record identifications and payment identifications. The fraud check of the travel record identification and the payment identification may include accessing, via a fraud database 173, fraud verification information associated with the travel record identification based on a first payment provider and verifying that payment transaction data is not fraudulent. For example, fraud verification information may include various identification information to identify a user, such as IP address, browser, browser configuration, device, location, available hardware, booking details (e.g., travel record, order information, etc.), user behavior, payment method, and the like. The data collection of the various information may be collected by a third-party SDK. Verifying that the payment transaction data is not fraudulent may be based on the collected fraud verification information and may be used to identify a suspicious profile, and/or if a user already provided a legitimate payment.

In some implementations, the payment request does not include a payment identification. The payment identification may be sent back by the one or more payment consolidation server(s) 160 after the payment request has been made, and serves as a key during the full payment process, between the device 110 and the one or more payment consolidation server(s) 160. The payment identification may be used throughout the payment process and is associated to all payment and travel details, which can be restored from the one or more payment consolidation server(s) 160 at any time. In some implementations, payment identification may not be included in the payment data, as a payment provider does not need payment identification to process a payment. For example, the one or more payment consolidation server(s) 160 can restore the necessary payment data from the payment identification and send this data to a payment provider. Thus, the one or more payment consolidation server(s) 160 can associate the travel record with the payment identification and keep the association during the payment process.

In some implementations of the invention, the payment consolidation instruction set 170 further includes an authentication module 174 to verify a user making the payment on a client device 110 via a merchant webpage from a reservation server 120. In an exemplary embodiment of the invention, payment data may be received from the client device 110 at the payment consolidation user interface (e.g., via a payment processor SDK), and authentication may be performed of the client device based on the travel record identification by verifying authenticity information from the security database 175. Additionally, the authentication module 174 may perform sanity checks of the payment transaction data and the travel record data as a part of an authentication protocol. A fraudulent check, as described herein, may determine whether the transaction is fraudulent, while a sanity check may determine the information is consistent with information in the database(s). For example, the sanity check of the payment transaction data and the travel record data may include a record locator consistency check that includes an identification check between the payment identification and the travel record identification (e.g., a record locator (RLOC) consistency check). Additional sanity checks may include merchant matching, authorization approval and whether it was recent based on a time stamp, checking for follow-up or pending operations, confirming amount and currency of payment, and payment instrument matching.

The payment consolidation instruction set 170 further includes a payment module 176 for implementing the payment processing scheme between a payment provider via a payment processor server 150 and a client device 110.

In some implementations of the invention, the payment consolidation instruction set 170 further includes a user interface module 178 for generating the payment consolidation user interface based on a payment consolidation SDK integration (e.g., integrating one or more payment processor SDKs to a single interface for a reservation server 120 web page to display at a device 110). An example payment consolidation user interface is further discussed herein with reference to payment consolidation user interface 420 of FIG. 4.

Figure 2:
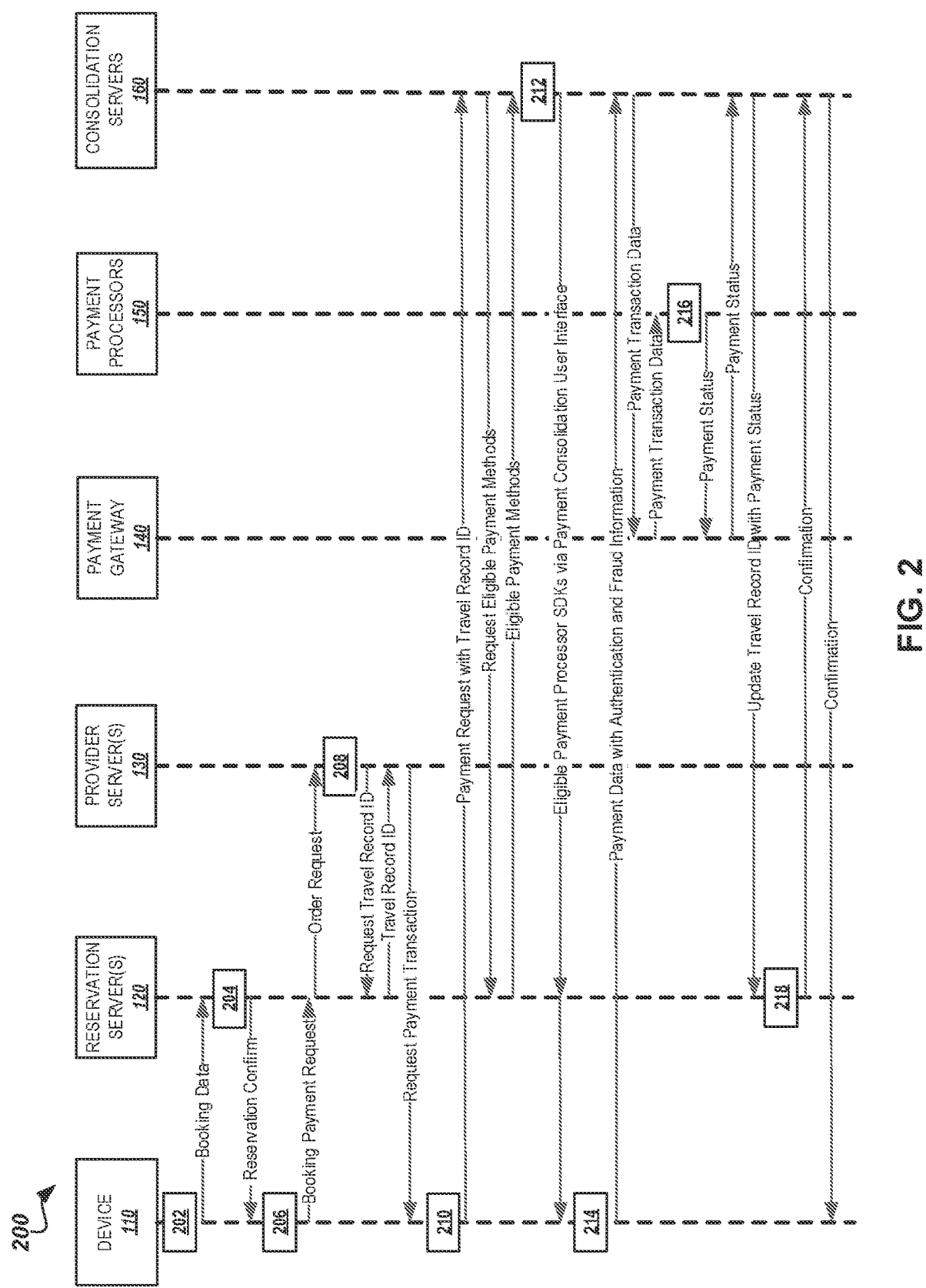
FIG. 2 illustrates an example routine in the form of a sequence diagram that may be performed by the distributed database environment shown in FIG. 1 as a procedure to facilitate a payment consolidation process for a travel booking, according to embodiments of the invention.

An example routine of implementing a payment consolidation protocol as illustrated in the environment of FIG. 1 is further discussed herein with reference to sequence diagram 200 of FIG. 2.

FIG. 2 illustrates an example routine in the form of a sequence diagram 200 that may be performed by the distributed database environment shown in FIG. 1 as a procedure to facilitate a payment consolidation process for a travel booking, according to embodiments of the invention. FIG. 2 provides an exemplary routine that may be performed by the client device 110, the reservation server(s) 120, the travel provider server(s) 130, the payment gateway server(s) 140, the payment processor server(s) 150, and/or the payment consolidation server(s) 160 consistent with some embodiments of the invention to process a secure payment for a reserved travel booking via a payment consolidation user interface (e.g., a single interface that integrates SDKs from multiple payment processor entities). The sequence diagram 200 is initiated at block 202 at a client device 110 via application 112 (e.g., a travel request is entered at a consumer device that initiates a payment website). The travel booking request is received by a reservation server 120. In response, at block 204, the reservation server 120 reserves a travel booking associated with the booking request and generates an associated PNR. A reservation confirmation is communicated from the reservation server 120 to the client device 110 (e.g., a temporary travel reservation is made, pending consumer confirmation and payment).

At block 206, consumer confirmation for the reservation is entered at the client device 110 (e.g., the traveler wants to proceed to pay for the ticket), and a booking payment request is communicated to the reservation servers 120. The reservation servers 120 then communicate an order request to the travel provider server 130. At block 208, the travel provider server 130, in response to the order request, stores the associated PNR for the travel reservation in the travel record database 135. According to some implementations of the invention, after receiving the order request, the travel provider server 130 requests and receives the travel record ID from the reservation server 120. The travel provider server 130 then sends a request for a payment transaction (e.g., form of payment (FOP) and payment data) to the client device 110. The travel provider server 130 can request the payment transaction via the reservation server 120, or directly communicate the request to the client device 110 (e.g., a payment portal window/application).

At block 210, a user is presented with and selects to proceed with a payment transaction at the client device 110. A payment request with the travel record identification is then sent to the payment consolidation server 160. The payment consolidation server 160 then initiates a payment consolidation protocol to obtain the necessary information from the reservation server 120 (e.g., which payment processors to display as options for payment) in order to generate a payment consolidation user interface. Thus, the payment consolidation server 160 requests the eligible payment methods from the reservation server 120. The reservation server 120 then provides the eligible payment methods to the payment consolidation server 160.

At block 212, the payment consolidation server 160 acquires the eligible payment methods from the reservation server 120 and generates a payment consolidation user interface based on the associated payment processor SDKs, where the payment processor SDKs are integrated within a single view on the client device 110 (e.g., widget applications). The payment consolidation server 160 then sends the eligible payment processor SDKs via a payment consolidation user interface to the client device 110. The payment data (e.g., form of payment and payment information), including any authentication information, fraud information, security information, etc., is then transmitted from the client device 110 (e.g., entered via the payment consolidation user interface through the reservation server 120 website) to the payment consolidation server 160.

The payment transaction data is then communicated to one of the payment processor servers 150 via the one or more payment gateway server(s) 140. At block 216, the payment processor server 150 (e.g., the processor selected by the gateway servers 140) conducts the payment transaction with a processor (e.g., a bank, a credit/debit card issuer, a digital payment service, etc.). The payment processor server 150 communicates a payment status message (e.g., a payment confirmation ID) to the payment consolidation server 160 via the payment gateway servers 140. The payment consolidation server 160 then sends a message to update the travel record ID (e.g., PNR) with the payment status to the reservation server 120.

At block 218, the reservation server 120 then updates the travel record ID with the payment status (e.g., client paid for the reservation). As illustrated, a payment confirmation message may then be sent to the client device 110 from the reservation server 120 via the payment consolidation server 160 to be viewed on the payment consolidation user interface.

Alternatively, the payment processor server 150 may directly send a payment confirmation message to the client device 110, and the payment processor server 150 may communicate the payment confirmation ID to the travel provider server 130. According to some implementations of the invention, after receiving the payment confirmation message and/or payment confirmation ID, the travel provider server 130 requests and receives the travel record ID from the reservation server 120. In addition, the travel provider server 130 may send booking confirmation data to the reservation server 120, and in response, the reservation server 120 can communicate an issuance confirmation message to the client device. The issuance confirmation may be generated during (e.g., at the same time, initiated at block 218), or right after the payment transaction is completed.

Figure 3:
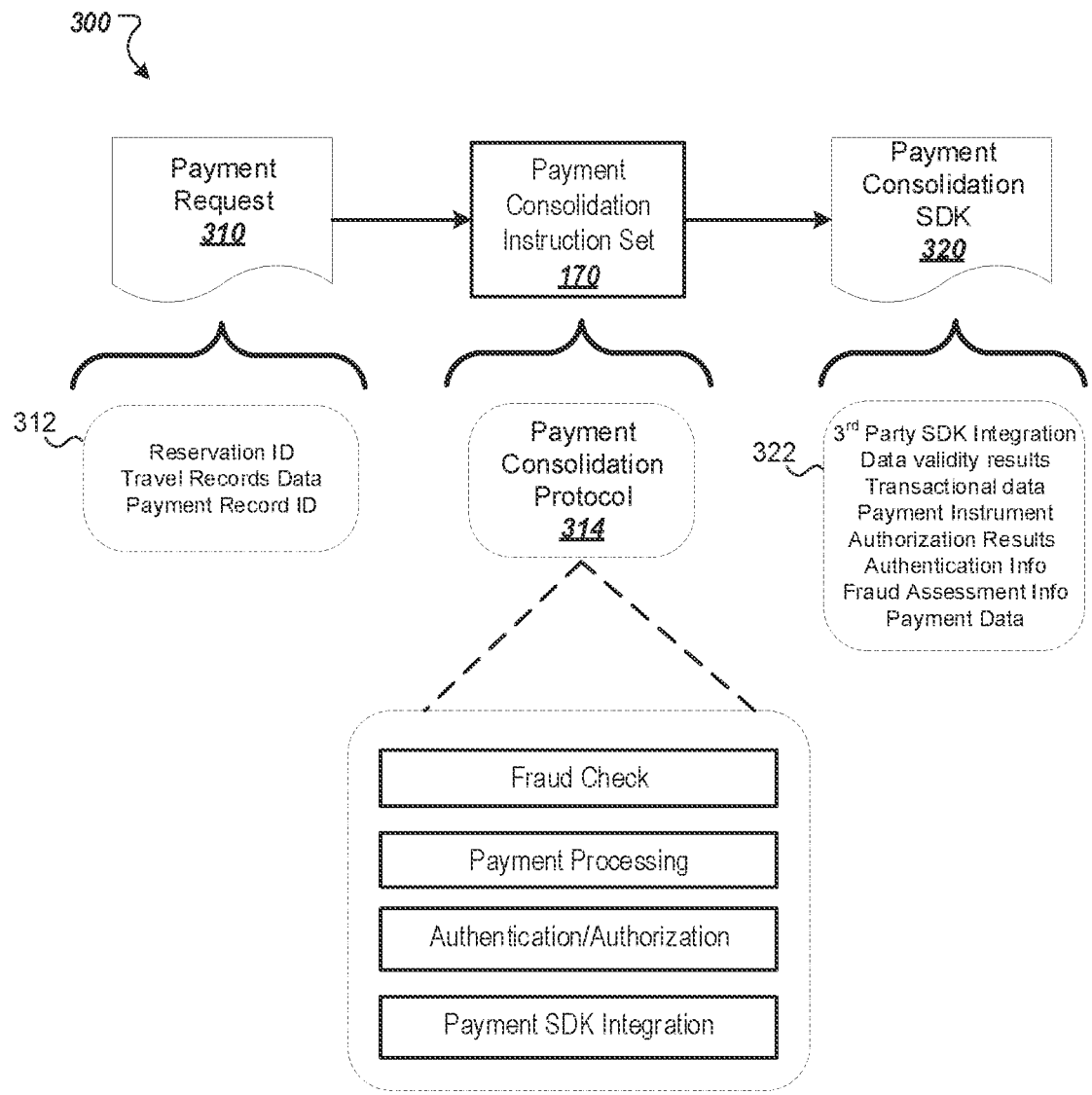
FIG. 3 illustrates example payment consolidation processes based on a payment request, according to embodiments of the invention.

The actions of the payment consolidation server(s) 160 utilizing the payment consolidation instruction set 170 to process a payment consolidation protocol are further described herein with reference to the illustration in FIG. 3.

FIG. 3 illustrates an example payment consolidation processes based on a payment request, according to embodiments of the invention. In particular, FIG. 3 illustrates an example environment 300 for a payment consolidation implementation for determining a payment consolidation SDK 320 (e.g., generating a consolidated user interface) based on receiving a payment request 310. The SDK 320 may be a web-based interface, a native application on a device, or any other type of interface. The objective for the payment consolidation instruction set 170 is to display to an end user a consolidated user interface with different payment options from multiple payment providers such that the merchants do not have to separately integrate the various SDKs individually on their touchpoints in order to accept payments. For example, the airline industry may desire to offer payment scope (e.g., credit cards, digital payment vehicles, cryptocurrency, fraud check, and the like) on all the airline merchants digital touchpoints (e.g., booking, check-in, etc.). For example, the payment consolidation instruction set 170, stored on one or more payment consolidation server(s) 160, receives a payment request 310 (e.g., from a client device 110). The payment request 310 includes payment request information 312 (e.g., travel/reservation ID, travel records data, payment record ID, etc.) that is associated with a travel reservation. In some implementations, the complete set of payment data is not in the request query (e.g., payment request information 312), however, the payment record ID allows the payment consolidation instruction set 170 to identify the payment transaction in the database to retrieve all the related payment data.

The payment consolidation instruction set 170 initiates a payment consolidation protocol 314 (e.g., block 212 of FIG. 2) to generate payment consolidation SDK 320 (e.g., a consolidated user interface). The payment consolidation protocol 314 includes, for example, a fraud check process, a payment processing process, an authentication/authorization process, and a payment SDK integration process. For example, the fraud module 172 performs a fraud check of the payment request information 312 (e.g., the travel record data) by determining that the payment transaction data is not fraudulent. Additionally, the authentication module 174 verifies the payment request information 312 (e.g., the payment transaction data and the travel record data) by performing a authenticity check that includes an identification check between the payment identification and the travel record identification (e.g., a record locator (RLOC) consistency check). Performing the authentication of the payment transaction data and the travel record data may include determining that the travel provider server has access to a particular set of data of the payment transaction data and the travel record data. Additional sanity checks may include merchant matching, authorization approval and whether it was recent based on a time stamp, checking for follow-up or pending operations, confirming amount and currency of payment, and payment instrument matching. The payment consolidation protocol 314 further includes a payment module 176 for implementing the payment processing scheme between a payment provider via a payment processor server 150 and a device 110. The payment consolidation protocol 314 further includes the payment SDK integration process that integrates each travel merchant's separate SDK into a single payment consolidation user interface. An example consolidated user interface that integrates each travel merchant's separate SDK is further discussed herein with reference to payment consolidation user interface 420 of FIG. 4.

The payment consolidation SDK 320 may include payment consolidation results data 322 such as data validity results, transactional data associated with the payment transaction, the payment instrument, authorization results, authentication information, fraud assessment information, and payment transaction data. An example illustration of implementing a payment consolidation protocol as illustrated in FIG. 3 is further discussed herein with reference to example environment 400 of FIG. 4.

Figure 4:
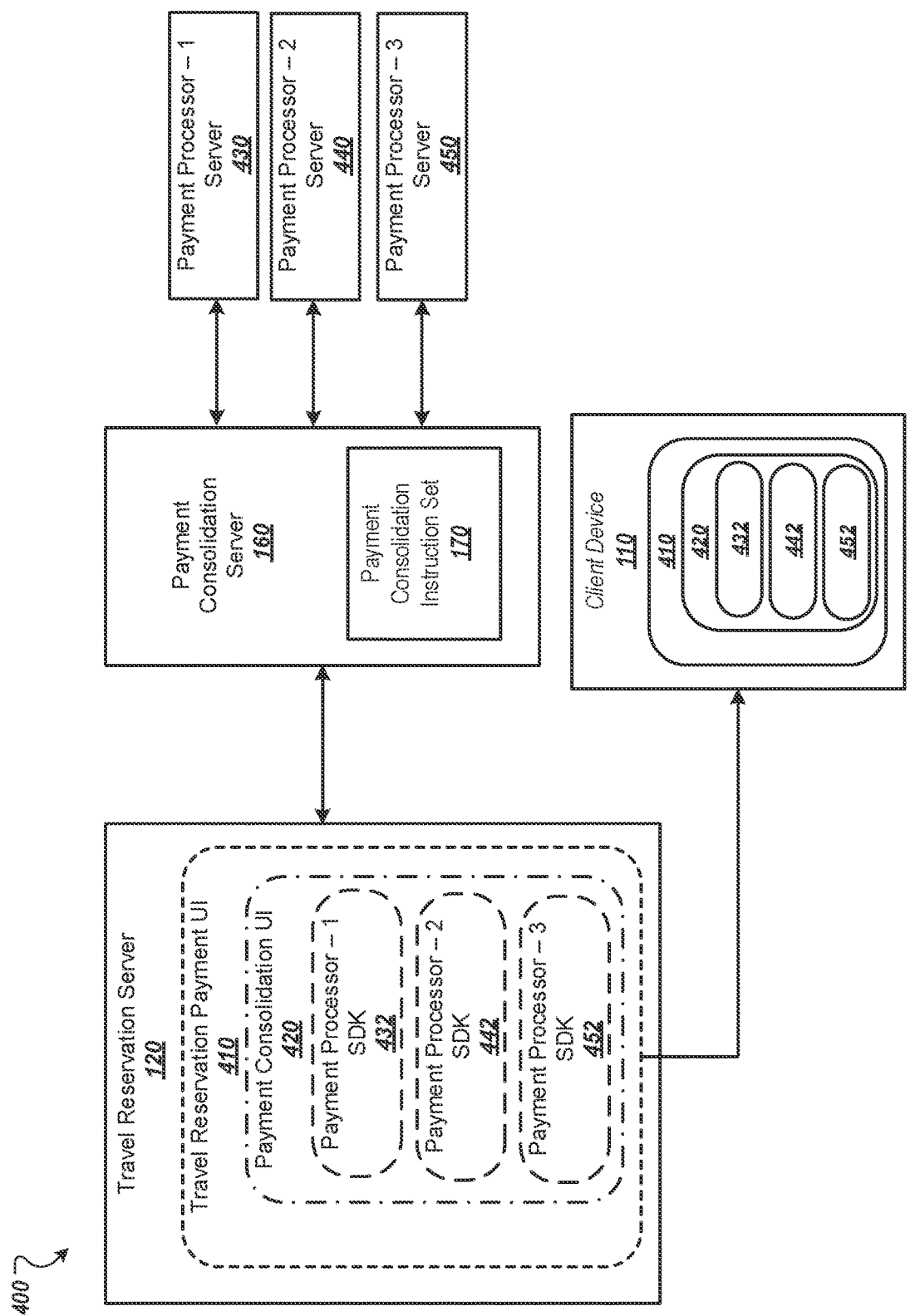
FIG. 4 illustrates example payment consolidation processes via a payment consolidation user interface, according to embodiments of the invention.

FIG. 4 illustrates example payment consolidation processes via a payment consolidation user interface in an example environment 400, according to embodiments of the invention. The example environment 400 illustrates an example data flow to provide access to multiple payment processors (e.g., payment processor servers 150 of FIG. 1) at a single user interface (e.g., payment consolidation user interface 420) via a merchant's webpage.

The example environment 400 includes a reservation server 120, a payment consolidation server 160, three different payment processor servers (e.g., payment processor—1 server 430, payment processor—2 server 440, and payment processor—3 server 450) that communicate over a data communication network (e.g., network 102 of FIG. 1). The payment consolidation user interface 420 includes payment processor—1 SDK 432 associated with payment processor—1 server 430, payment processor—2 SDK 442 associated with payment processor—1 server 440, and payment processor—3 SDK 452 associated with payment processor—1 server 450. The payment consolidation user interface 420 is included (embedded) within the travel reservation payment UI 410 that is hosted on the reservation server 120. Additionally, or alternatively, the payment consolidation user interface 420 may also be hosted on the payment consolidated server 160.

In an exemplary embodiment of the invention, payment consolidation user interface 420 provides touchpoint access for an end user at client device 110 to be able to select a particular method of payment (e.g., credit card, bank, digital currency, etc.) and/or from a particular payment processor (e.g., ABC Bank versus Bank XYZ). For example, a merchant's webpage can utilize a payment consolidation protocol to provide the end user quick access to multiple different payment options by integrating each payment processor's SDKs (e.g., SDKs 432, 442, 452) directly into a payment portal (e.g., payment consolidation UI 420) within the merchant's webpage (e.g., travel reservation payment UI 410) so that each merchant does not need to integrate the various SDKs individually on their touchpoints in order to accept payments. An example process of implementing a payment consolidation protocol as illustrated in FIG. 4 is further discussed herein with reference to process 500 of FIG. 5.

Figure 5:
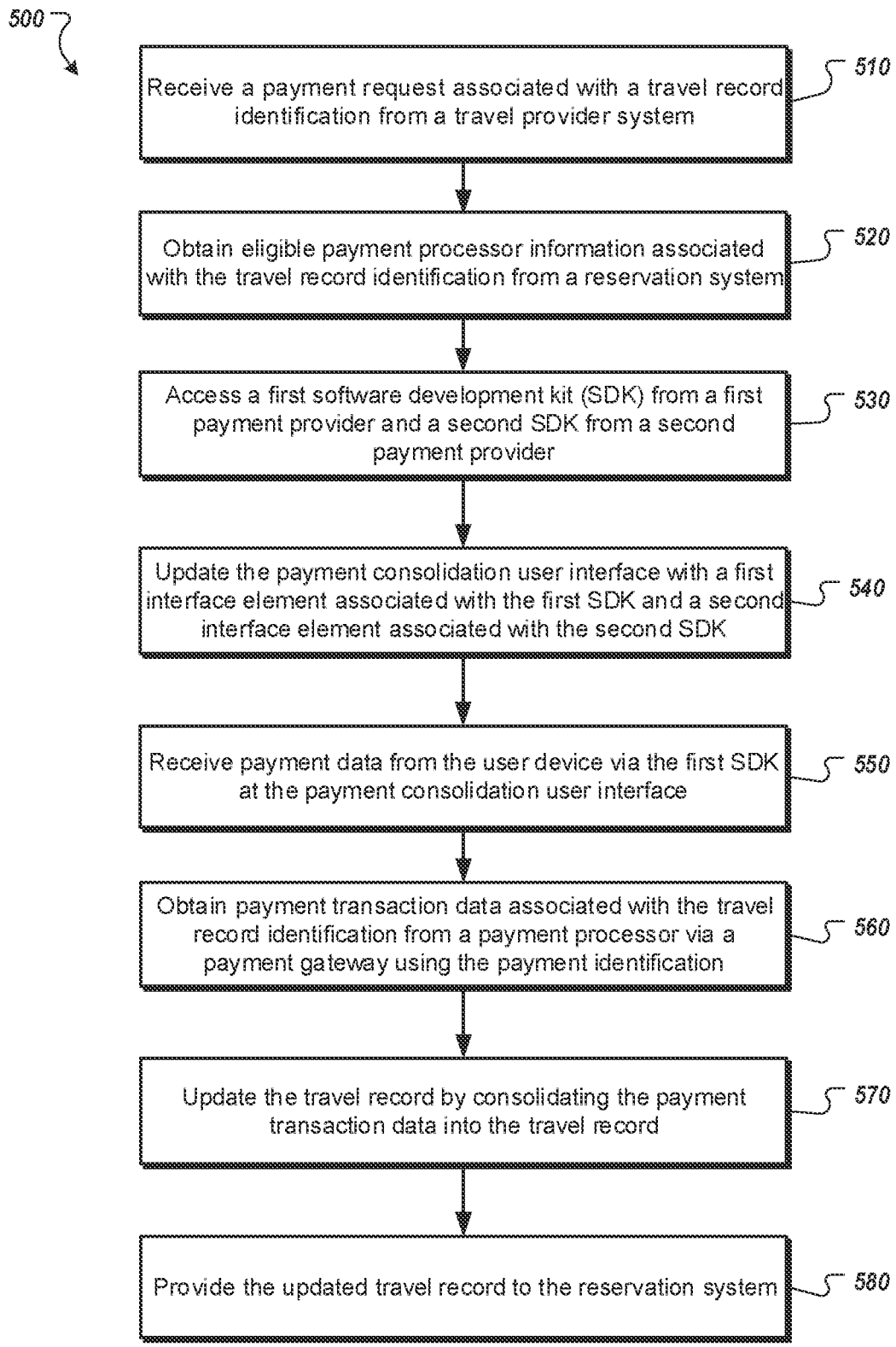
FIG. 5 is a flowchart of an example process for updating a payment consolidation user interface based on a payment request, according to embodiments of the invention.

FIG. 5 illustrates a flowchart of an example process 500 for updating a payment consolidation user interface based on a payment request, according to embodiments of the invention. Operations of the process 500 can be implemented, for example, by a system that includes one or more data processing apparatus, such as one or more payment consolidation server(s) 160 of FIG. 1 utilizing a payment consolidation instruction set 170. The process 500 can also be implemented by instructions stored on computer storage medium, where execution of the instructions by a system that includes a data processing apparatus cause the data processing apparatus to perform the operations of the process 500.

The system receives a payment request including a travel record identification from a travel provider server (510). The payment request is received at a payment consolidation server via a payment consolidation user interface (e.g., payment consolidation UI 420 of FIG. 4) at a device (e.g., device 110), where the payment consolidation user interface is a first level interface that is configured to provide access to a plurality of payment processor servers (e.g., payment processor servers 430, 440, 450, and the like) after the respective SDKs are integrated therein. For example, as illustrated in the sequence diagram 200 of FIG. 2, the client device 110 initiates a payment request to one of the payment consolidation servers 160. A payment identification is associated with the travel record identification. The reservation system (e.g., reservation server 120) processes the travel record identification.

The system obtains eligible payment processor information associated with the travel record identification from a reservation system (520). For example, as illustrated in the sequence diagram 200 of FIG. 2, at block 212, the reservation server 120, initiates a payment consolidation protocol by communicating eligible payment methods to one of the payment consolidation servers 160.

The system accesses a first software development kit (SDK) from a first payment provider and a second SDK from a second payment provider, where the first SDK includes a different configuration than the second SDK (530). For example, as illustrated in the sequence diagram 200 of FIG. 2, at block 212, after the payment consolidation server 160 receives the eligible payment methods from the reservation server 120, the payment consolidation server 160 dynamically loads and manages the associated SDKs for each payment processor associated with the eligible payment methods.

The system updates the payment consolidation user interface with a first interface element associated with the first SDK and a second interface element associated with the second SDK (540). For example, as illustrated in FIG. 4, a payment processor—1 SDK 432 is loaded for payment processor—1 server 430 (e.g., a bank server), and a payment processor—2 SDK 442 is loaded for payment processor—2 server 440 (e.g., a digital payment server).

In some embodiments of the invention, to determine the payment consolidation SDK to include in the interface element associated with the SDKs, the system performs an authorization check of the travel record identification and the payment identification, performs a fraud check of the payment transaction data and the travel record data, and generates the payment consolidation data based on the authorization check and the fraud check. For example, as illustrated in FIG. 3, the payment consolidation instruction set 170 initiates a payment consolidation protocol 314 (e.g., block 212 of FIG. 2) to generate payment consolidation SDK 320, where the payment consolidation protocol 314 includes an authorization check and a fraud check, payment processing, and payment SDK integration.

The system receives payment data from the device via the first SDK at the payment consolidation user interface (550). For example, a user at the client device 110, chooses to select payment through the payment processor associated with the payment processor—1 SDK 432. In response to receive payment data from the device, the system obtains payment transaction data associated with the travel record identification from a payment processor via a payment gateway using the payment identification (560). For example, the payment transaction data (e.g., FOP and payment information) is entered at the client device 110, and the payment transaction data is communicated to one of the payment processor servers 150 via the one or more payment gateway server(s) 140.

The system updates the travel record by consolidating the payment transaction data into the travel record (570) and provides the updated travel record to the reservation system (580). For example, as illustrated in the sequence diagram 200 of FIG. 2, at block 218, after the payment consolidation server 160 receives the payment status from the payment processor server 150 via the payment gateway server 140, the reservation server 120 then updates the travel record ID with the payment status (e.g., client paid for the reservation). As illustrated, a payment confirmation message may then be sent to the client device 110 from the reservation server 120 via the payment consolidation server 160 to be viewed on the payment consolidation user interface.

In some implementations of the invention, performing the fraud check of the travel record identification and the payment identification includes determining that the payment identification has not been already received by comparing the payment identification to other received payment identifications. Each payment processor SDK may include embedded instructions to implement a fraud check. For example, the payment consolidation instruction set 170 may include a fraud module 172 for performing fraud checks of travel record identifications and payment identifications. The fraud check of the travel record identification and the payment identification may include accessing, via a fraud database 173, fraud verification information associated with the travel record identification based on a first payment provider, and verifying that payment transaction data is not fraudulent.

In some implementations of the invention, performing the fraud check of the travel record identification and the payment identification is implemented by another entity (e.g., not the payment processor). Thus, in an exemplary implementation of the invention, the payment consolidation user interface includes a third interface element associated with a third SDK that is associated with a fraud service entity, wherein the program instructions further cause the computing apparatus to receive fraud information associated with the payment transaction data via the third SDK. For example, an SDK associated with fraud prevention entity may be embedded as a separate user interface element within the payment consolidation user interface 420.

In some implementations of the invention, each payment processor SDK (e.g., payment processor—1 SDK 432) may include embedded instructions for to implement an authentication protocol based on the travel record identification. For example, performing the sanity check of the payment transaction data and the travel record data as part of an authentication protocol may include determining that the travel provider server has access to a particular set of data of the payment transaction data and the travel record data. In some implementations of the invention, process 500 further includes determining configuration data according to the travel provider server having access to the particular set of data of the payment transaction data and the travel record data.

In some implementations of the invention, a validity check of the travel record identification and the payment identification is performed as a part of the authentication protocol. The validity check may include determining that the payment identification has not been already received by comparing the payment identification to other received payment identifications. In some implementations of the invention, generating the payment consolidation data based on the validity check of the travel record identification and the payment identification and the sanity check of the payment transaction data and the travel record data is customizable based on configuration data.

In some implementations, the payment request does not include a payment identification. The payment identification may be sent back by the one or more payment consolidation server(s) 160 after the payment request has been made, and serves as a key during the full payment process, between the device 110 and the one or more payment consolidation server(s) 160. The payment identification may be used throughout the payment process and is associated to all payment and travel details, which can be restored from the one or more payment consolidation server(s) 160 at any time. In some implementations, payment identification may not be included in the payment data, as a payment provider does not need payment identification to process a payment. For example, the one or more payment consolidation server(s) 160 can restore the necessary payment data from the payment identification and send this data to a payment provider. Thus, the one or more payment consolidation server(s) 160 can associate the travel record with the payment identification and keep the association during the payment process.

In some implementations of the invention, performing a sanity check as part of an authentication protocol includes a record locator consistency check that includes an identification check between the payment identification and the travel record identification (e.g., a record locator (RLOC) consistency check). Additional sanity checks may include merchant matching, authorization approval and whether it was recent based on a time stamp, checking for follow-up or pending operations, confirming amount and currency of payment, and payment instrument matching. For example, in some implementations of the invention, performing the sanity check of the payment transaction data and the travel record data includes determining that a merchant associated with the payment transaction data matches a merchant associated with the travel record data (e.g., merchant matching). Additionally, or alternatively, performing the sanity check of the payment transaction data and the travel record data includes determining that authorization of payment associated with the payment transaction data was successful (e.g., authorization approval confirmation). Additionally, or alternatively, performing the sanity check of the payment transaction data and the travel record data includes determining that an authorization associated with the payment transaction data is valid based on an authorization time stamp (e.g., recent authorization verification, i.e., 14 days old max by default). Additionally, or alternatively, performing the sanity check of the payment transaction data and the travel record data includes determining that there is not an attempted follow-up operation or a pending follow-up operation associated with the payment transaction data (e.g., verification of follow-up or pending actions). Additionally, or alternatively, performing the sanity check of the payment transaction data and the travel record data includes determining that an amount and currency of payment associated with the payment transaction data is available (e.g., currency verification). Additionally, or alternatively, performing the sanity check of the payment transaction data and the travel record data includes determining that a payment instrument associated with the payment transaction data matches a payment instrument associated with the travel record data (e.g., payment instrument matching).

In some implementations of the invention, based on generating the payment consolidation data, the process 500 further includes storing the travel record associated with the payment consolidation data in a payment consolidation database (e.g., payment record database 165). For example, a data mapping process may include storing the updated payment record, which adds of payment data in the travel database.

In some implementations of the invention, a payment consolidation SDK of the payment consolidation user interface includes at least one of third party payment processor SDK integration data, data validity results, transactional data associated with the payment identification, a payment instrument, authorization information, authentication information, fraud assessment information, and payment data.

Figure 6:
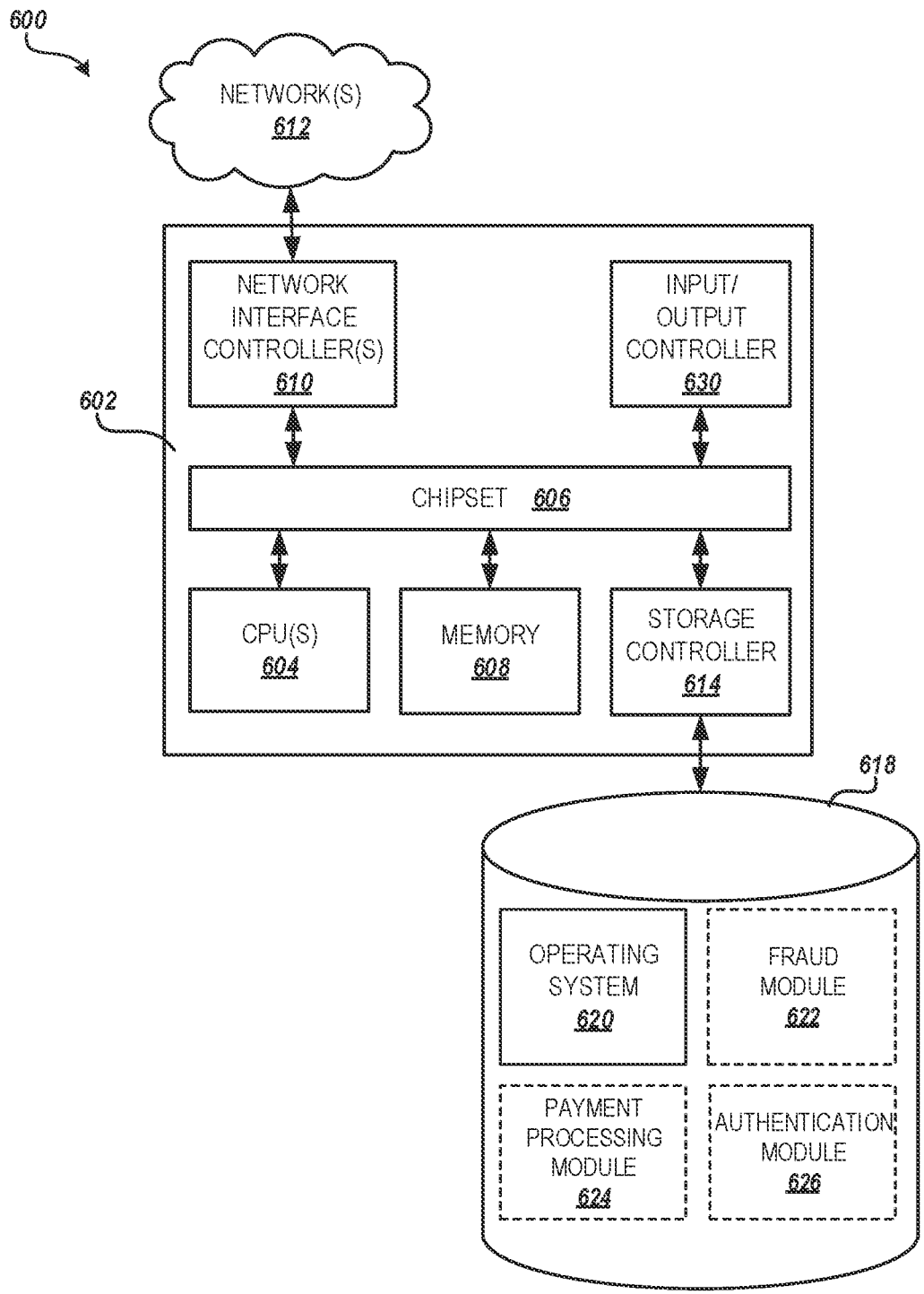
FIG. 6 is a block diagram showing an example computer architecture for a computer capable of executing the software components described herein, according to embodiments described herein.

FIG. 6 illustrates an example computer architecture 600 for a computer 602 capable of executing the software components described herein for the sending/receiving and processing of tasks. The computer architecture 600 (also referred to herein as a "server") shown in FIG. 6 illustrates a server computer, workstation, desktop computer, laptop, a server operating in a cloud environment, or other computing device, and may be utilized to execute any aspects of the software components presented herein described as executing on a host server, or other computing platform. The computer 602 preferably includes a baseboard, or "motherboard," which is a printed circuit board to which a multitude of components or devices may be connected by way of a system bus or other electrical communication paths. In one illustrative embodiment, one or more central processing units (CPUs) 604 operate in conjunction with a chipset 606. The CPUs 604 can be programmable processors that perform arithmetic and logical operations necessary for the operation of the computer 602.

The CPUs 604 preferably perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 606 provides an interface between the CPUs 604 and the remainder of the components and devices on the baseboard. The chipset 606 may provide an interface to a memory 608. The memory 608 may include a random-access memory (RAM) used as the main memory in the computer 602. The memory 608 may further include a computer-readable storage medium such as a read-only memory (ROM) or non-volatile RAM (NVRAM) for storing basic routines that that help to startup the computer 602 and to transfer information between the various components and devices. The ROM or NVRAM may also store other software components necessary for the operation of the computer 602 in accordance with the embodiments described herein.

According to various embodiments, the computer 602 may operate in a networked environment using logical connections to remote computing devices through one or more networks 612, a local-area network (LAN), a wide-area network (WAN), the Internet, or any other networking topology known in the art that connects the computer 602 to the devices and other remote computers. The chipset 606 includes functionality for providing network connectivity through one or more network interface controllers (NICs) 610, such as a gigabit Ethernet adapter. For example, the NIC 610 may be capable of connecting the computer 602 to other computer devices in the utility provider's systems. It should be appreciated that any number of NICs 610 may be present in the computer 602, connecting the computer to other types of networks and remote computer systems beyond those described herein.

The computer 602 may be connected to at least one mass storage device 618 that provides non-volatile storage for the computer 602. The mass storage device 618 may store system programs, application programs, other program modules, and data, which are described in greater detail herein. The mass storage device 618 may be connected to the computer 602 through a storage controller 614 connected to the chipset 606. The mass storage device 618 may consist of one or more physical storage units. The storage controller 614 may interface with the physical storage units through a serial attached SCSI (SAS) interface, a serial advanced technology attachment (SATA) interface, a fiber channel (FC) interface, or other standard interface for physically connecting and transferring data between computers and physical storage devices.

The computer 602 may store data on the mass storage device 618 by transforming the physical state of the physical storage units to reflect the information being stored. The specific transformation of physical state may depend on various factors, in different embodiments of the invention of this description. Examples of such factors may include, but are not limited to, the technology used to implement the physical storage units, whether the mass storage device 618 is characterized as primary or secondary storage, or the like. For example, the computer 602 may store information to the mass storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 602 may further read information from the mass storage device 618 by detecting the physical states or characteristics of one or more particular locations within the physical storage units.

The mass storage device 618 may store an operating system 620 utilized to control the operation of the computer 602. According to some embodiments, the operating system includes the LINUX operating system. According to another embodiment, the operating system includes the WINDOWS® SERVER operating system from MICROSOFT Corporation of Redmond, Wash. According to further embodiments, the operating system may include the UNIX or SOLARIS operating systems. It should be appreciated that other operating systems may also be utilized. The mass storage device 618 may store other system or application programs and data utilized by the computer 602, such as fraud module 622 to perform the fraud checks for a payment consolidation process, a payment processing module 624 for managing a payment consolidation process, and an authentication module 626 for managing an authentication process (e.g., sanity checks, validity checks, etc.), according to embodiments described herein. Other system or application programs and data utilized by the computer 602 may be provided as well (e.g., a security module, a user interface module, etc.).

In some embodiments, the mass storage device 618 may be encoded with computer-executable instructions that, when loaded into the computer 602, transforms the computer 602 from being a general-purpose computing system into a special-purpose computer capable of implementing the embodiments described herein. These computer-executable instructions transform the computer 602 by specifying how the CPUs 604 transition between states, as described above. According to some embodiments, from the payment consolidation server(s) 160 perspective, the mass storage device 618 stores computer-executable instructions that, when executed by the computer 602, perform portions of the process 500, for implementing a payment consolidation system, as described herein. In further embodiments, the computer 602 may have access to other computer-readable storage medium in addition to or as an alternative to the mass storage device 618.

The computer 602 may also include an input/output controller 630 for receiving and processing input from a number of input devices, such as a keyboard, a mouse, a touchpad, a touch screen, an electronic stylus, or other type of input device. Similarly, the input/output controller 630 may provide output to a display device, such as a computer monitor, a flat-panel display, a digital projector, a printer, a plotter, or other type of output device. It will be appreciated that the computer 602 may not include all of the components shown in FIG. 6, may include other components that are not explicitly shown in FIG. 6, or may utilize an architecture completely different than that shown in FIG. 6.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically includes computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A computing apparatus comprising:
one or more processors;
at least one memory device coupled with the one or more processors; and
a data communications interface operably associated with the one or more processors,
wherein the at least one memory device contains a plurality of program instructions that, when executed by the one or more processors, cause the one or more processors to:
receive, at a payment consolidation server via a payment consolidation user interface at a client device, a payment request comprising a travel record identification from a travel provider server, wherein a payment identification is associated with the travel record identification, and the payment consolidation user interface is a first level interface that provides access to a plurality of payment processor servers;
obtain, at the payment consolidation server, eligible payment processor information associated with the travel record identification from a reservation system, wherein the reservation system processes the travel record identification;
determine, based on the eligible payment processor information, a subset of payment providers to access from a plurality of payment providers, wherein the subset of payment providers is selected based on determination of eligible payment methods associated with the payment request;
access, based on the determined selection of the subset of payment providers, a software development kit (SDK) from each payment provider of the determined selection of the subset of payment providers, wherein a first SDK of a first payment provider of the subset of payment providers comprises a different configuration than a second SDK of a second payment provider of the subset of payment providers;
dynamically load and manage, at the payment consolidation server, corresponding SDKs for each payment processor of the subset of payment providers;

identify a plurality of user interface elements comprising at least one user interface element from each SDK from each payment provider of the subset of the payment providers;

select a subset of the identified plurality of user interface elements based on the travel record identification, payment identification, and eligible payment processor information, wherein the selected subset of the identified plurality of user interface elements includes different interface elements from two or more different payment providers of the subset of payment providers;

dynamically update the payment consolidation user interface based on the selected subset of the identified plurality of user interface elements from the two or more different payment providers of the subset of payment providers, wherein the dynamically updated payment consolidation user interface comprises a single interface configured to perform payment transactions between the client device and a corresponding payment processor and consolidate payment transaction data into the travel record at the reservation system; and in response to receiving first payment data from the client device via the first SDK at the payment consolidation user interface:

obtain, at the payment consolidation server, corresponding payment transaction data associated with a corresponding travel record identification from a payment processor via a payment gateway associated with the first SDK using the payment identification;

implement a fraud check process based on identifying embedded instructions within the first SDK to implement a fraud check on the received payment data;

update, by the payment consolidation server, the travel record by consolidating the payment transaction data into the travel record based on verifying via the fraud check process that the payment transaction data is not fraudulent; and provide, by the payment consolidation server, the updated travel record to the reservation system.

2. The computing apparatus of claim 1, wherein the payment consolidation user interface comprises a third interface element associated with a third SDK that is associated with a fraud service entity, and wherein the fraud check process comprises receiving fraud information associated with the payment transaction data via the third SDK.

3. The computing apparatus of claim 2, wherein the fraud check process comprises accessing, via a fraud database, fraud verification information associated with the travel record identification and the subset of payment providers of the plurality of payment providers, wherein verifying via the fraud check process that the payment transaction data is not fraudulent is based on the fraud verification information.

4. The computing apparatus of claim 1, wherein the program instructions further cause the computing apparatus to:

determine that a first merchant associated with the payment transaction data matches a second merchant associated with the travel record data;

determine that authorization of payment associated with the payment transaction data is successful;

determine that an authorization associated with the payment transaction data is valid based on an authorization time stamp;

determine that there is not an attempted follow-up operation or a pending follow-up operation associated with the payment transaction data;

determine that an amount and currency of payment associated with the payment transaction data is available; and/or determine that a payment instrument associated with the payment transaction data matches a payment instrument associated with the travel record data.

5. The computing apparatus of claim 1, wherein the program instructions that further cause the computing apparatus to receive the payment data from the device via the first SDK at the payment consolidation user interface comprise:

program instructions to further cause the computing apparatus to perform authentication of the client device based on the travel record identification.

6. The computing apparatus of claim 1, wherein the program instructions further cause the computing apparatus to:

determine that the payment identification has not been already received by comparing the payment identification to other received payment identifications.

7. A method, comprising:

at a device comprising one or more processors:

receiving, at a payment consolidation server via a payment consolidation user interface at a client device, a payment request comprising a travel record identification from a travel provider server, wherein a payment identification is associated with the travel record identification, and the payment consolidation user interface is a first level interface that provides access to a plurality of payment processor servers;

obtaining, at the payment consolidation server, eligible payment processor information associated with the travel record identification from a reservation system, wherein the reservation system processes the travel record identification;

determining, based on the eligible payment processor information, a subset of payment providers to access from a plurality of payment providers, wherein the subset of payment providers is selected based on determination of eligible payment methods associated with the payment request;

accessing, based on the determined selection of the subset of payment providers, a software development kit (SDK) from each payment provider of the determined selection of the subset of payment providers, wherein a first SDK of a first payment provider of the subset of payment providers comprises a different configuration than a second SDK of a second payment provider of the subset of payment providers;

dynamically load and manage, at the payment consolidation server, corresponding SDKs for each payment processor of the subset of payment providers;

identifying a plurality of user interface elements comprising at least one user interface element from each SDK from each payment provider of the subset of the payment providers;

selecting a subset of the identified plurality of user interface elements based on the travel record identification, payment identification, and eligible payment processor information, wherein the selected subset of the identified plurality of user interface elements includes different interface elements from two or more different payment providers of the subset of payment providers;

dynamically updating the payment consolidation user interface based on the selected subset of the identified plurality of user interface elements from the two or more different payment providers of the subset of payment providers, wherein the dynamically updated payment consolidation user interface comprises a single interface configured to perform payment transactions between the client device and a corresponding payment processor and consolidate payment transaction data into the travel record at the reservation system; and in response to receiving first payment data from the client device via the first SDK at the payment consolidation user interface:

obtaining, at the payment consolidation server, corresponding payment transaction data associated with a corresponding travel record identification from a payment processor via a payment gateway associated with the first SDK using the payment identification;

implementing a fraud check process based on identifying embedded instructions within the first SDK to implement a fraud check on the received payment data;

updating, by the payment consolidation server, the travel record by consolidating the payment transaction data into the travel record based on verifying via the fraud check process that the payment transaction data is not fraudulent; and providing, by the payment consolidation server, the updated travel record to the reservation system.

8. The method of claim 7, wherein the payment consolidation user interface comprises a third interface element associated with a third SDK that is associated with a fraud service entity, and wherein the fraud check process comprises receiving fraud information associated with the payment transaction data via the third SDK.

9. The method of claim 8, wherein the fraud check process comprises accessing, via a fraud database, fraud verification information associated with the travel record identification and the subset of payment providers of the plurality of payment providers, and wherein verifying via the fraud check process that the payment transaction data is not fraudulent is based on the fraud verification information.

10. The method of claim 7, further comprising:
determining that a first merchant associated with the payment transaction data matches a second merchant associated with the travel record data;
determining that authorization of payment associated with the payment transaction data is successful;
determining that an authorization associated with the payment transaction data is valid based on an authorization time stamp;
determining that there is not an attempted follow-up operation or a pending follow-up operation associated with the payment transaction data;
determining that an amount and currency of payment associated with the payment transaction data is available; and/or
determining that a payment instrument associated with the payment transaction data matches a payment instrument associated with the travel record data.

11. The method of claim 7, wherein receiving the payment data from the device via the first SDK at the payment consolidation user interface further comprises:
performing authentication of the client device based on the travel record identification.

12. The method of claim 7, further comprising:
determining that the payment identification has not been already received by comparing the payment identification to other received payment identifications.

13. A non-transitory computer storage medium encoded with a computer program, the computer program comprising a plurality of program instructions that when executed by one or more processors cause the one or more processors to perform operations comprising:

receive, at a payment consolidation server via a payment consolidation user interface at a client device, a payment request comprising a travel record identification from a travel provider server, wherein a payment identification is associated with the travel record identification, and the payment consolidation user interface is a first level interface that provides access to a plurality of payment processor servers;

obtain, at the payment consolidation server, eligible payment processor information associated with the travel record identification from a reservation system, wherein the reservation system processes the travel record identification;

determine, based on the eligible payment processor information, a subset of payment providers to access from a plurality of payment providers, wherein the subset of payment providers is selected based on determination of eligible payment methods associated with the payment request;

access, based on the determined selection of the subset of payment providers, a software development kit (SDK) from each payment provider of the determined selection of the subset of payment providers, wherein a first SDK of a first payment provider of the subset of payment providers comprises a different configuration than a second SDK of a second payment provider of the subset of payment providers;

dynamically load and manage, at the payment consolidation server, corresponding SDKs for each payment processor of the subset of payment providers;

identify a plurality of user interface elements comprising at least one user interface element from each SDK from each payment provider of the subset of the payment providers;

select a subset of the identified plurality of user interface elements based on the travel record identification, payment identification, and eligible payment processor information, wherein the selected subset of the identified plurality of user interface elements includes different interface elements from two or more different payment providers of the subset of payment providers;

dynamically update the payment consolidation user interface based on the selected subset of the identified plurality of user interface elements from the two or more different payment providers of the subset of payment providers, wherein the dynamically updated payment consolidation user interface comprises a single interface configured to perform payment transactions between the client device and a corresponding payment processor and consolidate payment transaction data into the travel record at the reservation system; and in response to receiving first payment data from the client device via the first SDK at the payment consolidation user interface:

obtain, at the payment consolidation server, corresponding payment transaction data associated with a corresponding travel record identification from a payment processor via a payment gateway associated with the first SDK using the payment identification;

implement a fraud check process based on identifying embedded instructions within the first SDK to implement a fraud check on the received payment data;

update, by the payment consolidation server, the travel record by consolidating the payment transaction data into the travel record based on verifying via the fraud check process that the payment transaction data is not fraudulent; and provide, by the payment consolidation server, the updated travel record to the reservation system.

14. The non-transitory computer storage medium of claim 13, wherein the payment consolidation user interface comprises a third interface element associated with a third SDK that is associated with a fraud service entity, and wherein the fraud check process comprises receiving fraud information associated with the payment transaction data via the third SDK.

* * * * *